US012315424B2

(12) United States Patent
Cho

(10) Patent No.: US 12,315,424 B2
(45) Date of Patent: May 27, 2025

(54) DISPLAY DEVICE FOR OUTPUTTING COMPENSATION DATA BASED ON DRIVING FREQUENCY OF PREVIOUS FRAME

(71) Applicant: LG Display Co., Ltd., Seoul (KR)

(72) Inventor: Minho Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/387,357

(22) Filed: Nov. 6, 2023

(65) Prior Publication Data

US 2024/0257699 A1 Aug. 1, 2024

(30) Foreign Application Priority Data

Jan. 31, 2023 (KR) ........................ 10-2023-0012226

(51) Int. Cl.
*G09G 3/20* (2006.01)
*G09G 3/3233* (2016.01)

(52) U.S. Cl.
CPC ......... *G09G 3/2096* (2013.01); *G09G 3/2007* (2013.01); *G09G 3/3233* (2013.01); *G09G 2300/0819* (2013.01); *G09G 2300/0842* (2013.01); *G09G 2300/0852* (2013.01); *G09G 2310/08* (2013.01); *G09G 2320/0233* (2013.01); *G09G 2320/045* (2013.01); *G09G 2330/021* (2013.01); *G09G 2340/0435* (2013.01)

(58) Field of Classification Search
CPC ..................................................... G09G 3/2096
USPC ........................................................... 345/212
See application file for complete search history.

(56) References Cited

U.S. PATENT DOCUMENTS

2021/0049958 A1* 2/2021 Kim ........................ G09G 3/325
2023/0086572 A1* 3/2023 Kwon .................. G09G 3/3275
345/204

* cited by examiner

*Primary Examiner* — Long D Pham
(74) *Attorney, Agent, or Firm* — Birch, Stewart, Kolasch & Birch, LLP

(57) ABSTRACT

Discussed is a display device including a frequency calculator configured to calculate a driving frequency of a previous frame and compare the driving frequency of the previous frame and a threshold driving frequency, a compensation data calculator configured to calculate compensation data based on a comparison result of the frequency calculator that the driving frequency of the previous frame is lower than the threshold driving frequency a data storage configured to provide the compensation data corresponding to the calculated compensation data to an image data output unity, and the image data output unit configured to output the compensation data to a data driver.

20 Claims, 9 Drawing Sheets

DISPLAY DEVICE FOR OUTPUTTING COMPENSATION DATA BASED ON DRIVING FREQUENCY OF PREVIOUS FRAME

CROSS-REFERENCE TO RELATED APPLICATION

The present application claims priority to Korean Patent Application No. 10-2023-0012226, filed in the Republic of Korea on Jan. 31, 2023, the entire contents of which is hereby expressly incorporated by reference into the present application.

BACKGROUND OF THE DISCLOSURE

Field

The disclosure relates to a display device with improved brightness.

Discussion of the Related Art

With continued development of means of obtaining information in society, various needs for a display device that better displays an image are increasing, and various types of display devices, such as a liquid crystal display device, and an organic light emitting diode display are being further developed to meet the needs.

An image displayed on the display device can include a still image or a moving image, and the moving image can be of various types such as sports images, game images, and movies having varied actions speeds. Some display devices can operate in a variable refresh rate (VRR) mode in which a driving frequency is varied according to the types of images, and improves image quality but also enable reducing power consumption and extending the life of the display devices.

In such a display device having the VRR mode, when there is little change in an input image, pixels can be driven at a low frequency (for example, at a low speed) to lower the refresh rate. However, the voltages of the pixels are discharged while the pixels are driven at the low speed, thereby causing a difference in brightness between the pixels, and leading to quality degradation such as image distortion or flicker.

SUMMARY OF THE DISCLOSURE

An aspect of the disclosure is to provide a display device of which brightness is prevented from being varied due to frequency variations.

According to an embodiment, a display device can include: a frequency calculator configured to calculate a driving frequency of a previous frame and compare the driving frequency of the previous frame and a threshold driving frequency; a compensation data calculator configured to calculate compensation data based on a comparison result of the frequency calculator that the driving frequency of the previous frame is lower than the threshold driving frequency; a data storage configured to provide compensation data corresponding to the calculated compensation data to an image data output unit; and the image data output unit configured to output the compensation data to a data driver.

Details of other embodiments are included in the detailed description and the accompanying drawings.

According to embodiments, a display device is improved in brightness varied depending on frequencies.

However, effects obtainable from the disclosure may not be limited by the aforementioned effects, and other unmentioned effects can be clearly understood from the following description by a person having ordinary knowledge in the art to which the disclosure pertains.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Below, embodiments will be described with reference to the accompanying drawings. In this disclosure, when a certain element (or area, layer, portion, etc.) is referred to as being “on,” “connected to,” or “coupled to” another element, it can be directly on, connected to, or coupled to the other element, or a third element can be intervened therebetween.

Like numerals refer to like elements. Further, in the accompanying drawings, the thicknesses, proportions, and dimensions of the elements area exaggerated for effective technical description. The term “and/or” includes any of one or more combinations that can be defined by associated elements.

Although the terms first, second, etc. can be used herein to describe various elements, these elements are not limited by these terms. These terms are only used to distinguish one element from another element. For example, a first element can be termed a second element, and, similarly, a second element can also be termed a first element, without departing from the scope of the disclosure. The singular forms are intended to include the plural forms as well, unless the context clearly indicates otherwise.

The terms “below,” “lower,” “above,” “upper” and the like are used for describing a relationship between the elements shown in the accompanying drawings. These terms are relative, and described with reference to the orientation shown in the accompanying drawings.

It should be understood that the terms “include” or “have” are merely intended to indicate that the features, numbers, steps, operations, elements, components, or combinations thereof are present, and are not intended to exclude a possibility that one or more other features, numbers, steps, operations, elements, components, or combinations thereof will be present or added.

Figure 1:
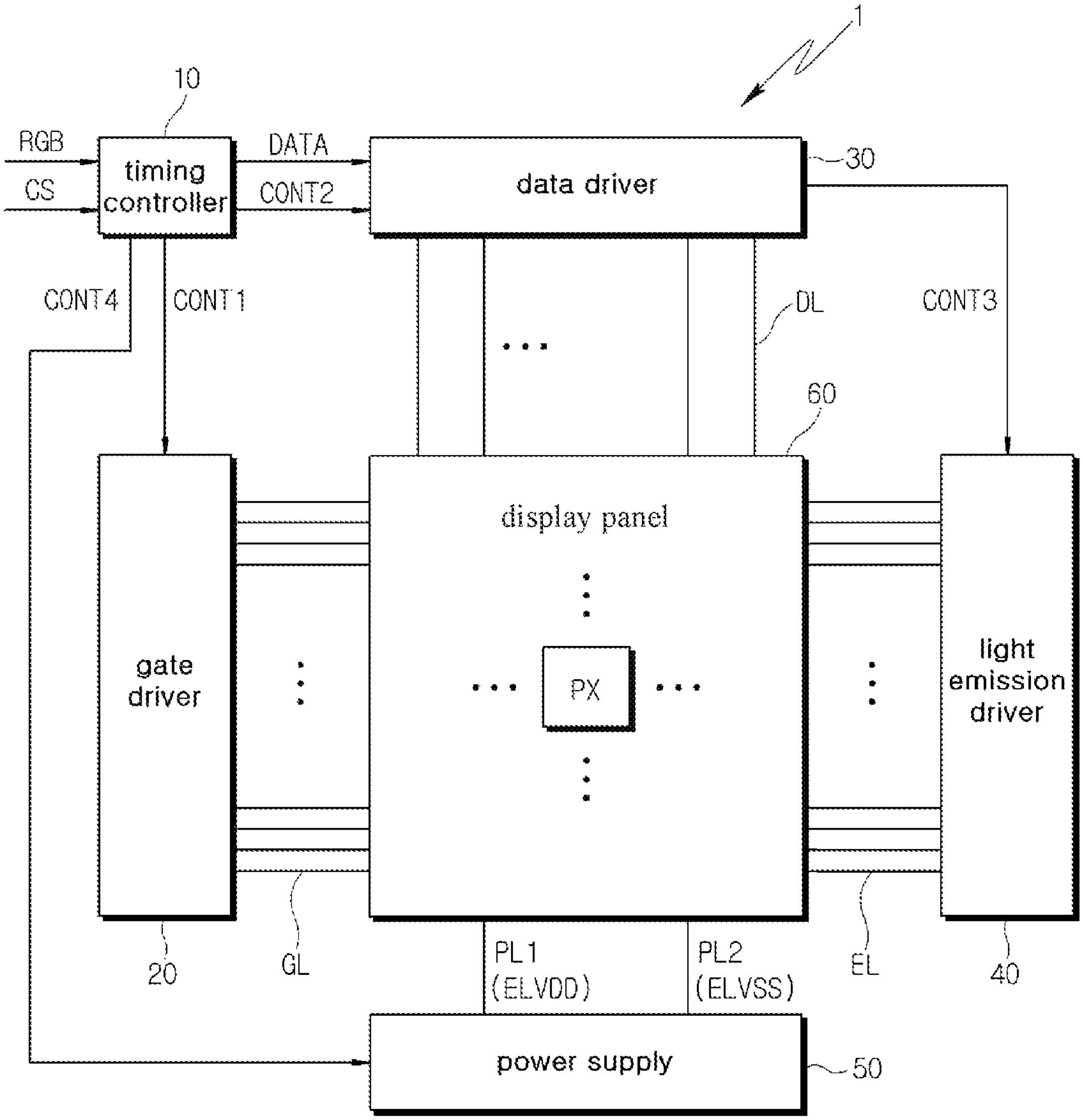
FIG. 1 is a block diagram of a display device according to an embodiment of the present disclosure.

FIG. 1 is a block diagram of a display device according to an embodiment of the present disclosure.

Referring to FIG. 1, a display device 1 includes a timing controller 10, a gate driver 20, a data driver 30, a light emission driver 40, a power supply 50, and a display panel 60. But embodiments of the present disclosure are not limited thereto. All components of each display device according to all embodiments of the present disclosure are operatively coupled and configured.

The timing controller 10 can receive an image signal RGB and a control signal CS from an external host system or the like. The image signal RGB can include a plurality of pieces of grayscale data. The control signal CS may, for example, include a horizontal synchronization signal, a vertical synchronization signal, and a main clock signal. But embodiments of the present disclosure are not limited thereto.

The timing controller 10 can process the image signal RGB and the control signal CS to be suitable for operation conditions of the display panel 60, and output image data DATA, a gate driving control signal CONT1, a data driving control signal CONT2, a light-emission driving control signal CONT3, and a power supplying control signal CONT4. But embodiments of the present disclosure are not limited thereto, and additional control signals can be used.

The gate driving control signal CONT1 can include a scan timing control signal such as a gate start pulse, a gate shift clock, and a gate output enable signal. The data driving control signal CONT2 can include a data timing control signal such as a source sampling clock, a polarity control signal, and a source output enable signal.

The timing controller 10 can be disposed on a control printed circuit board connected to a source printed circuit board by a connection medium such as a flexible flat cable (FFC) or a flexible printed circuit (FPC), in which the source printed circuit board includes the data driver 30 bonded thereto. For example, the timing controller 10 can be connected to the data driver 30 through an embedded clock point-to-point interface (EPI) wiring pair to transceive data.

The gate driver 20 can sequentially output gate signals by one horizontal period within one frame through the gate line GL in response to the gate driving control signal CONT1 received from the timing controller 10. Thus, a pixel row connected to each gate line GL is turned on by one horizontal period. During one horizontal period, the data signal can be applied to the pixel row turned on by the gate line GL.

The gate driver 20 can include stage circuits respectively connected to a plurality of gate line GL, and can be configured as a gate in panel (GIP) mounted to the display panel 60. The gate driver 20 can include a shift register, a level shifter, etc. But embodiments of the present disclosure are not limited thereto.

The data driver 30 converts digital image data DATA received from the timing controller 10 into an analog data signal based on the data driving control signal CONT2. The data driver 30 can transmit the analog data signal to the corresponding pixels PX through the data line DL.

The data driver 30 can include a source drive circuit or a source driving integrated chip (IC). The data driver 30 can be connected to a bonding pad of the display panel 60 by a tape-automated-bonding (TAB) method or a chip-on-glass (COG) method, or can be directly disposed on the display panel 60. As necessary, the data driver 30 can be integrated and disposed on the display panel 60.

The light emission driver 40 can generate light emission signals based on a light-emission driving control signal CONT3 output from the timing controller 10. The light emission driver 40 can provide the generated gate signals to the pixels PX through a plurality of light-emission lines EL.

The power supply 50 can convert an external input voltage into a high potential voltage ELVDD and a low potential voltage ELVSS as standard voltages to be used in internal elements of the display device 1 in response to the power supplying control signal CONT 4. The power supply 50 outputs the generated driving voltages ELVDD and ELVSS to the internal elements through the power lines PL1 and PL2. The power supply 50 can be disposed on the control printed circuit board on which the timing controller 10 is disposed. The power supply 50 can also be referred to as a power management integrated circuit (PMIC).

On the display panel 60, a plurality of pixels PX (or subpixels) are disposed. For example, the pixels PX can be arranged as a matrix on the display panel 60. The pixels PX disposed in a one-pixel row are connected to the same gate line GL, and the pixels PX disposed in one pixel column are connected to the same data line DL, but embodiments of the present disclosure are not limited thereto. The pixels PX can emit light with a brightness level corresponding to a data signal supplied through the data lines DL.

According to an embodiment, each pixel PX can display any one of the colors among red, green and blue. According to another embodiment, each pixel PX can display any one of the colors among cyan, magenta, and yellow. According to an alternative embodiment, each pixel PX can display any one of colors among red, green, blue and white. But embodiments of the present disclosure are not limited thereto, as colors from various color systems can be used.

The timing controller 10, the gate driver 20, the data driver 30, the light emission driver 40, and the power supply 50 can be respectively configured as individual integrated circuits (IC), or at least some of them can also be integrated into an IC. Further, at least one of the gate driver 20 and the light emission driver 40 can be implemented as an in-panel type to be formed integrally with the display panel 60, but embodiments of the present disclosure are not limited thereto.

According to an embodiment of the present disclosure, the display device 1 can be driven in the VRR mode where the driving frequency is varied. The refresh rate can refer to a period/frequency at which data voltage is supplied (or programmed) to the pixel. For example, the display device 1 can be driven at a refresh rate higher or lower than a predetermined reference refresh rate. The operation of driving the display device 1 at a refresh rate lower than the reference refresh rate can be referred to as a 'low rate operation,' and the operation of driving the display device 1 at a refresh rate higher than the reference refresh rate can be referred to as a 'high rate operation.' In the low rate operation, the display device 1 programs or applies the data voltage to the pixel at a lower cycle/frequency that that of the reference refresh rate. In the high rate operation, the display device 1 programs or applies the data voltage to the pixel at a higher cycle/frequency than that of the reference refresh rate. The refresh rate can be set according to, but is not limited to, the types of an image to be displayed.

Figure 2:
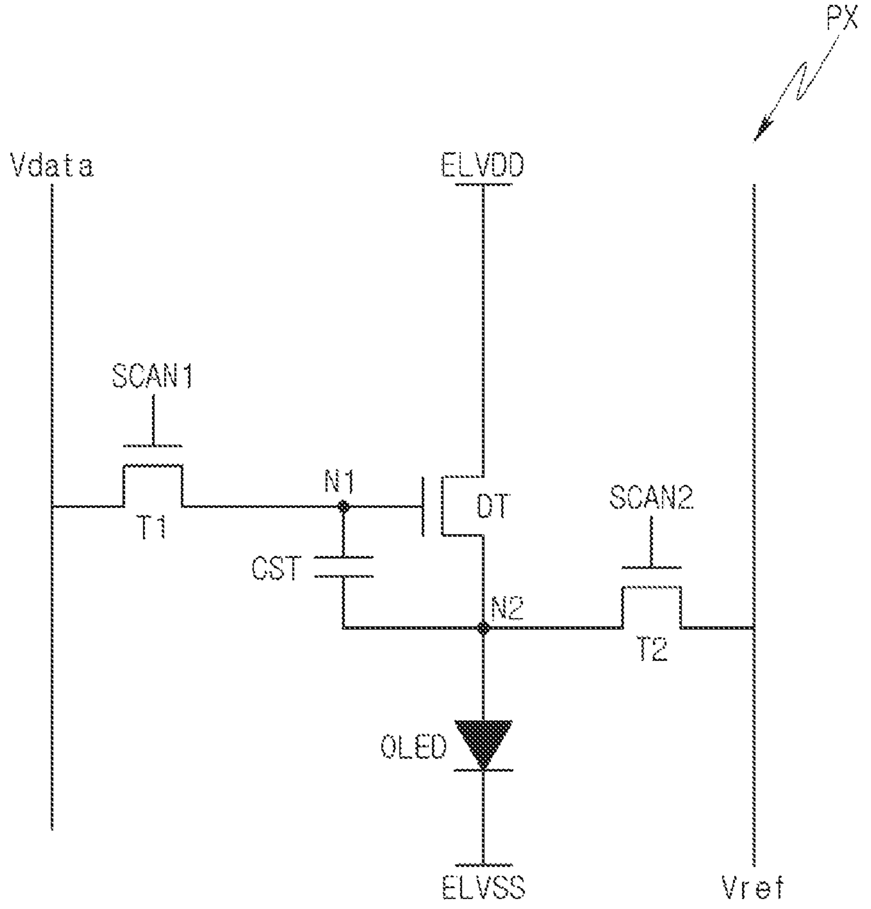
FIG. 2 is a pixel circuit diagram of a pixel circuit in a display device according to an embodiment of the present disclosure.

FIG. 2 is a pixel circuit diagram of a pixel circuit in a display device according to an embodiment of the present disclosure.

FIG. 2 by example shows the pixel PX for illustrative purposes, and the structure of the pixel PX is not limited as long as the pixel PX can control the light emission of the light emitting diode OLED. For example, the pixel PX can include an additional switching thin film transistor (TFT), and a connection relationship of the switching TFTs or a connection position of a capacitor can be varied. For ease of description, it will be described that a pixel PX has a pixel driving circuit of "3T1C."

Referring to FIG. 2, the pixel PX according to an embodiment of the present disclosure can include a pixel PX having a driving transistor DT and the light emitting diode OLED connected to the pixel PX.

The pixel PX can drive the light emitting diode OLED by controlling a driving current flowing in the light emitting diode OLED. The pixel PX can include the driving transistor DT, a scan transistor T1, an initialization transistor T2, and a storage capacitor CST. Each of the transistors DT, and T1 to T2 can include a first electrode, a second electrode, and a gate electrode, respectively. One of the first electrode and the second electrode therein can be a source electrode, and the other of the first electrode and the second electrode can be a drain electrode.

Each of the transistors DT and T1 to T2 can be a P-channel metal oxide semiconductor (PMOS) transistor or a an N-channel metal oxide semiconductor (NMOS) transistor. Below, descriptions will be made on the assumption that each of the transistors DT and T1 to T2 is the NMOS transistor. Therefore, the transistors DT and T1 to T2 can be turned on when a high-level voltage is applied thereto.

The light emitting diode OLED can include an anode and a cathode. The anode of the light emitting diode OLED can be connected to a second node N2, and the cathode can be connected to a low-potential driving voltage EL VSS.

The driving transistor DT can include a first electrode to which the high-potential voltage ELVDD is applied, a second electrode connected to the second node N2, and a gate electrode connected to a first node N1. The driving transistor DT can provide the driving current to the light emitting diode OLED based on the voltage at the first node N1 (or the data voltage stored in the storage capacitor CST to be described later).

The first transistor T1 can include a first electrode to which data voltage Vdata is applied, a second electrode connected to the first node N1, and a gate electrode to which a first scan signal SCAN1 is applied through any one of the gate lines GL (see FIG. 1). The first transistor T1 can be turned on in response to the scan signal SCAN1 and can transmit the data voltage Vdata to the first node N1.

The second transistor T2 can include a first electrode to which an initialization voltage Vref is applied, a second electrode connected to the second node N2, and a gate electrode to which a second scan signal SCAN2 is applied through any one of the gate lines GL (see FIG. 1). The second transistor T2 can be turned on in response to the second scan signal SCAN2 and can transmit the initialization voltage Vref to the second node N2.

The storage capacitor CST can be connected between the first node N1 and the second node N2. The storage capacitor CST can store or maintain a voltage corresponding to a difference between the data voltage Vdata provided to the first node N1 and the initialization voltage Vref provided to the second node N2.

Figure 3:
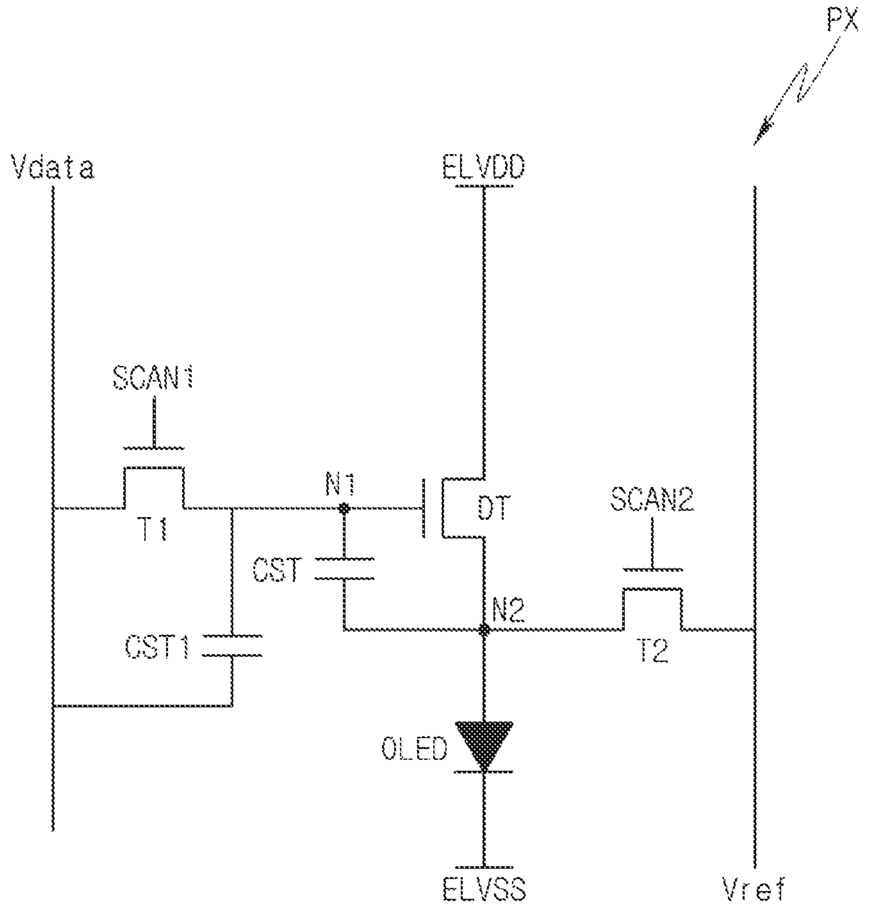
FIG. 3 is a pixel circuit diagram of a pixel circuit in a display device formed with a parasitic capacitor according to an embodiment of the present disclosure.

Meanwhile, referring to an embodiment of the present disclosure of FIG. 3, a parasitic capacitor CST1 can be formed between the data line DL (see FIG. 1) and the first node N1.

Figure 4:
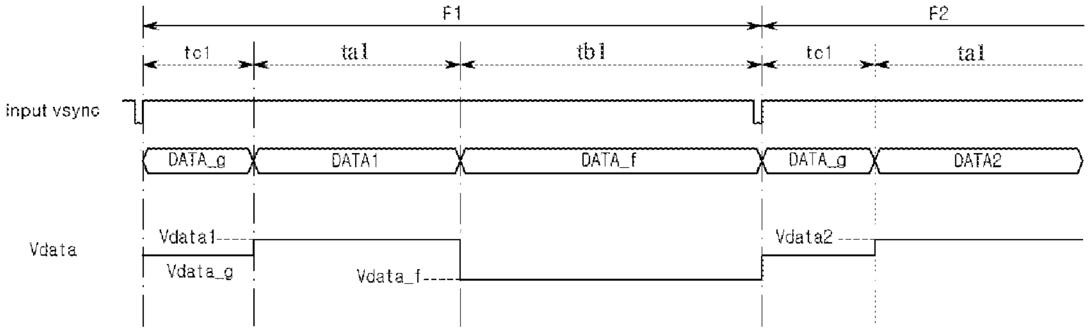
FIG. 4 is a waveform diagram of signals input to a display device according to an embodiment of the present disclosure.
Figure 5:
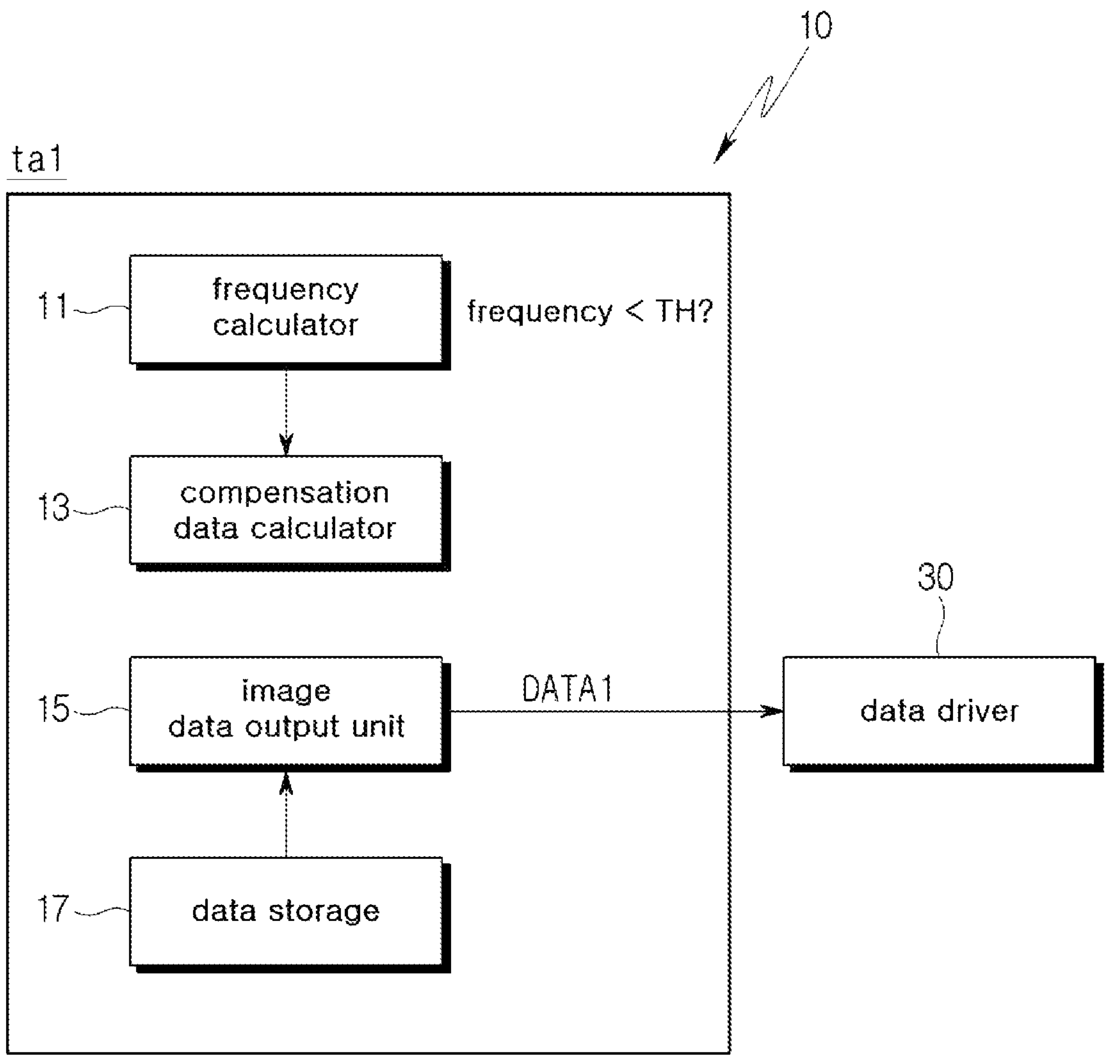
FIGS. 5 to 7 are diagrams showing elements of a timing controller according to an embodiment of the present disclosure.
Figure 6:
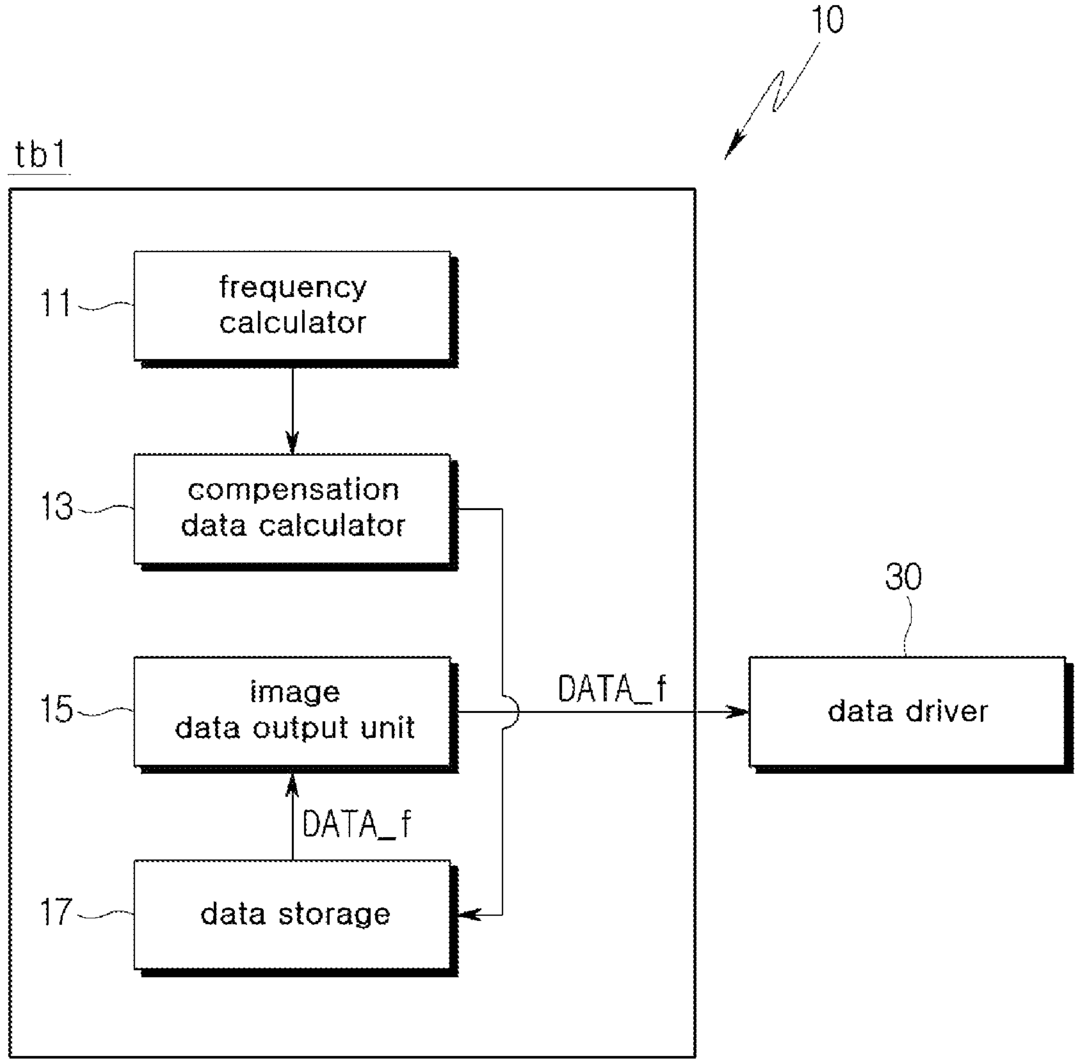
Figure 7:
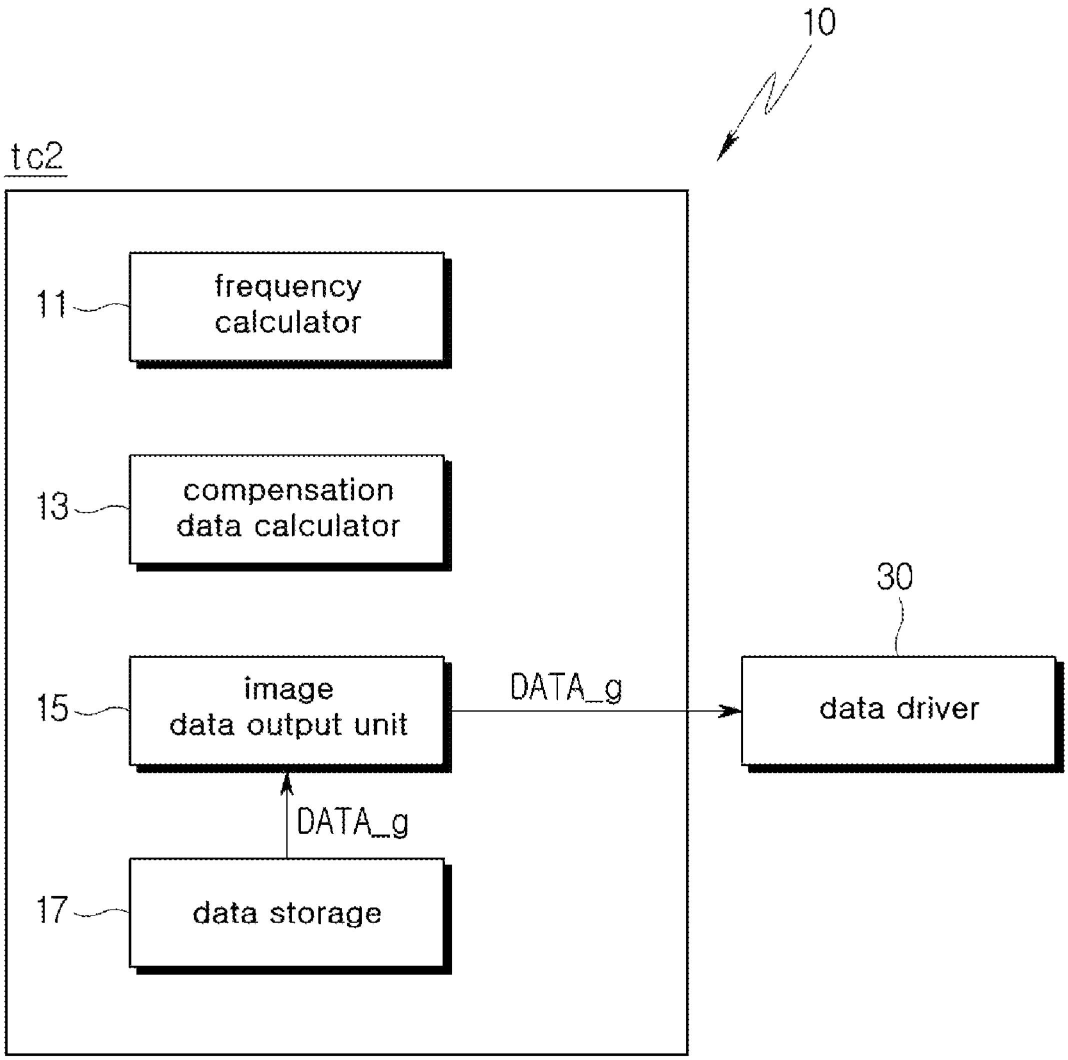

FIG. 4 is a waveform diagram of signals input to a display device according to an embodiment of the present disclosure. FIGS. 5 to 7 are diagrams showing elements of a timing controller according to an embodiment of the present disclosure.

Referring to FIGS. 2 to 7, the display device can include or provide first and second frames F1 and F2 when displaying an image.

FIG. 4 illustrates the first and second frames F1 and F2 by way of example, in which a vertical synchronization signal vsync is input before each start of the first and second frames F1 and F2. But, embodiments of the present disclosure are not limited thereto, as additional frames can be used. In various embodiments of the present disclosure, the first frame F1 can be an earlier frame and the second frame F2 can be a later frame chronologically or in sequence.

Referring to FIGS. 2 to 6, each of the first and second frames F1 and F2 can include an active period, a blank period, and a data preparation period, respectively. The active period can include active periods ta1 and ta2 of the first and second frames F1 and F2, respectively, the blank period can include a blank period tb1 of the first frame F1 and a blank period tb2 of the second frame F2, and the data preparation period can include data preparation periods tc1 and tc2 of the first and second frames F1 and F2, respectively.

The first frame F1 can include a first data preparation period tc1, a first active period ta1, and a first blank period tb1 in sequence. When the vertical synchronization signal vsync is input, the first data preparation period tc1 starts. The first data preparation period tc1 is substantially the same as a second data preparation period tc2 (to be described later), and thus the second data preparation period tc2 will be representatively described.

In the active periods ta1 and ta2, the scan transistor T1 shown in FIG. 2 can be turned on so that the data voltage Vdata can be input to the first node N1. The timing controller 10 can include, for example, a frequency calculator 11, a compensation data calculator 13, and an image data output unit 15. In the active periods ta1 and ta2, the image data DATA (see FIG. 1) can be provided to the data driver 30 through the image data output unit 15 of the timing controller 10.

As shown in FIG. 4 and FIG. 5, first image data DATA1 can be provided in the first active period ta1, and second image data DATA2 can be provided in the second active period ta2. The image data output unit 15 can receive the image data DATA1 and DATA2 from the data storage 17 and provide the image data DATA1 and DATA2, respectively, to the data driver 30.

The data driver 30 can provide analog data voltage Vdata corresponding to the image data DATA1 and DATA2 to the pixels PX of the display panel through the data lines DL. The data voltages Vdata having a first voltage level Vdata1 and a second voltage level Vdata2 can be provided to the pixels PX in the first active period ta1 and the second active period ta2, respectively. The first voltage level Vdata1 and the second voltage level Vdata2 shown in FIG. 4 can indicate a voltage level applied when the gate signal is applied to any one of the gate lines GL (see FIG. 1). In other words, the magnitudes of the first and the second voltage levels Vdata1 and Vdata2 shown in FIG. 4 are given by way of example.

In the first active period ta1, as shown in FIG. 4 and FIG. 5, a voltage corresponding to a difference between the data voltage Vdata having the first voltage level Vdata1 and the initialization voltage Vref stored in the first node N1 and supplied to the second node N2 is stored in the storage capacitor CST (see FIG. 2).

The frequency calculator 11 can calculate the driving frequency of the previous frame. For example, the frequency calculator 11 can calculate the frequency of a frame previous to the first frame F1, and the frequency of a frame previous to the second frame F2, i.e., the frequency of the first frame F1. The frequency calculator 11 may, for example, calculate the driving frequency of the previous frame based on the duration of the previous frame. In the active periods ta1 and ta2, the frequency calculator 11 can calculate the driving frequencies of the previous frames. In the active periods ta1 and ta2, the frequency calculator 11 can compare the driving frequency of the previous frame with a threshold driving frequency TH. When the driving frequency of the previous frame is lower than the threshold driving frequency TH, the frequency calculator 11 can provide a signal for calculating compensation data to the compensation data calculator 13.

The compensation data calculator 13 can calculate compensation data DATA_f based on the signal given to calculate the compensation data and provided by the frequency calculator 11. The calculation of the compensation data DATA_f can be based on the image data DATA (see FIG. 1) of the previous frame. For example, the compensation data calculator 13 can calculate an average value of the image data DATA (see FIG. 1) in the active period of the previous frame, and calculate the compensation data DATA_f based on the calculated average value of the image data DATA (see FIG. 1) of the previous frame. In some embodiments, the compensation data calculator 13 can calculate the compensation data DATA_f by considering a gain and/or an offset to the average value of the image data DATA (see FIG. 1) of the previous frame.

Based on the signal provided from the frequency calculator 11 to instruct the compensation data calculator 13 to calculate the compensation data, the calculation of the compensation data DATA_f can be performed in the first active period ta1.

As shown in FIGS. 4 and 6, in the first blank period tb1 of the first frame F1, the compensation data calculator 13 can provide data about the calculated compensation data DATA_f to the data storage 17, the data storage 17 can provide compensation data DATA_f corresponding to the calculated compensation data DATA_f to the image data output unit 15, and the image data output unit 15 can provide the compensation data DATA_f to the data driver 30. The data driver 30 can supply analog data voltage Vdata having a third voltage level Vdata_f corresponding to the compensation data DATA_f to the data line DL (see also FIG. 1). As shown in FIG. 4, provision of the compensation data DATA_f can stop at the end of the first blank period tb1, and before the start of the second frame F2.

In the first blank period tb1, the scan transistor T1 is turned off, and thus the data voltage Vdata is not applied to the first node N2.

As shown in FIGS. 4 and 7, in the second data preparation period tc2 of the second frame F2, the data storage 17 can provide gray image data DATA_g to the image data output unit 15, and the image data output unit 15 can provide the gray image data DATA_g to the data driver 30. The data driver 30 can supply the analog data voltage Vdata having a fourth voltage level Vdata_g corresponding to the gray image data DATA_g to the data line DL (see also FIG. 1). In various embodiments of the present disclosure, the first voltage level Vdata1 and the second voltage level Vdata2 can be greater than the third voltage level Vdata_f and that of the fourth voltage level Vdata_g, Also, the third voltage level Vdata_f can be less than the fourth voltage level Vdata_g, but embodiments of the present disclosure are not limited thereto.

In the second data preparation period tc2, the scan transistor T1 is turned off, and thus the data voltage Vdata is not applied to the first node N2.

As described above, in the first active period ta1, the data voltage Vdata having the first voltage level Vdata1 is stored in the first node N1, and a voltage corresponding to a difference between the data voltage Vdata and the initialization voltage Vref supplied to the second node N2 can be stored in the storage capacitor CST. Based on the difference voltage stored in the storage capacitor CST, the light emitting diode EL can emit light with predetermined brightness in the first blank period tb1 of the first frame F1 and the second data preparation period tc2 of the second frame F2.

As described above with reference to FIG. 3, the parasitic capacitor CST1 can be formed between the data line DL (see FIG. 1) and the first node N1. Therefore, the voltage of the first node N1 can be varied depending on the data voltage Vdata supplied to the data line DL (see FIG. 1) in the blank period of the frame exclusive of the active period, and thus the difference voltage stored in the storage capacitor CST can be varied in the first active period ta1, thereby causing light emission abnormality.

Typically, the frame can include an active period synchronized with the input of the vertical synchronization signal vsync, and a blank period other than the active period. In the blank period, the image data output unit 15 can provide gray image data DATA_g to the data driver 30. Meanwhile, the gray image data DATA_g can be pre-stored in the data storage 17 and can have one value. The value of the gray image data DATA_g can be set such that the image data DATA (see FIG. 1) in the active period of the next frame is not overshot by the value of the gray image data DATA_g after the blank period. In other words, when the value of the gray image data DATA_g is so small that the difference between the gray image data DATA_g and the image data DATA (see FIG. 1) in the active period of the next frame can be greater than or equal to a reference value, the analog data voltage Vdata converted from the image data DATA (see FIG. 1) in the active period of the next frame can be overshot. Therefore, the value of the gray image data DATA_g (or the analog data voltage Vdata converted from the gray image data DATA_g) can be set to be different by the reference value or below from the value of the image data DATA (see FIG. 1) of the next frame (or from the analog data voltage Vdata converted from the image data DATA (see FIG. 1)).

However, when the value of the gray image data DATA_g (or the analog data voltage Vdata converted from the gray image data DATA_g) can be set and fixed to be different by the reference value or below from the value of the image data DATA (see FIG. 1) of the next frame (or from the analog data voltage Vdata converted from the image data DATA (see FIG. 1)), the image data DATA (see FIG. 1) in the active period may not be taken into account, thereby causing the foregoing light emission abnormality.

Accordingly, in the display device 1 according to an embodiment, the frequency calculator 11 can calculate the driving frequency of the previous frame, compare the driving frequency of the previous frame and the threshold driving frequency TH, and provide a signal for instructing the compensation data calculator 13 to calculate the compensation data when the driving frequency of the previous frame is lower than the threshold driving frequency TH, and the compensation data calculator 13 can calculate the compensation data DATA_fbased on the image data DATA (see FIG. 1) of the previous frame in response to the signal provided by the frequency calculator 11 and instructing the compensation data calculator 13 to calculate the compensation data. The image data storage 17 can provide the compensation data DATA_f corresponding to the calculated compensation data DATA_f to the image data output unit 15, and the image data output unit 15 can provide the compensation data DATA_f to the data driver 30. Accordingly, the voltage of the first node N1 can be varied depending on the data voltage Vdata supplied to the data line DL (see FIG. 1) in the blank period of the frame other than the active period, thereby preventing light emission abnormality due to variations in the difference voltage stored in the storage capacitor CST in the first active period ta1.

Figure 8:
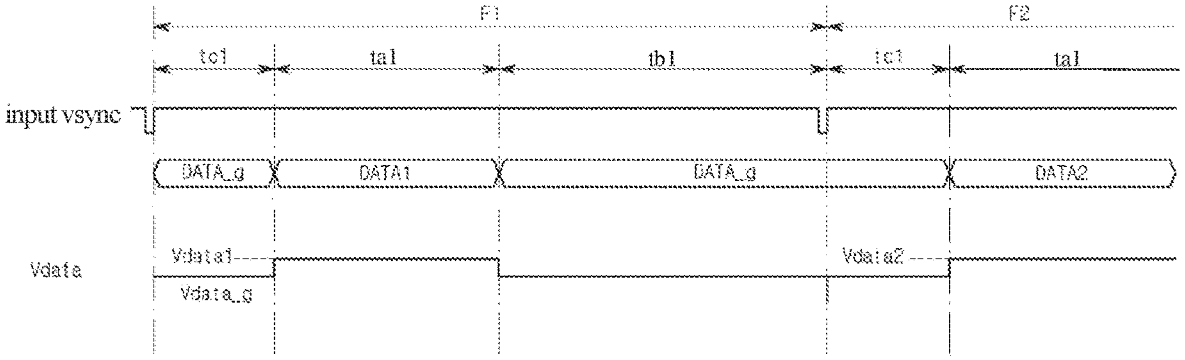
FIG. 8 is a waveform diagram of signals input to a display device according to an embodiment of the present disclosure.
Figure 9:
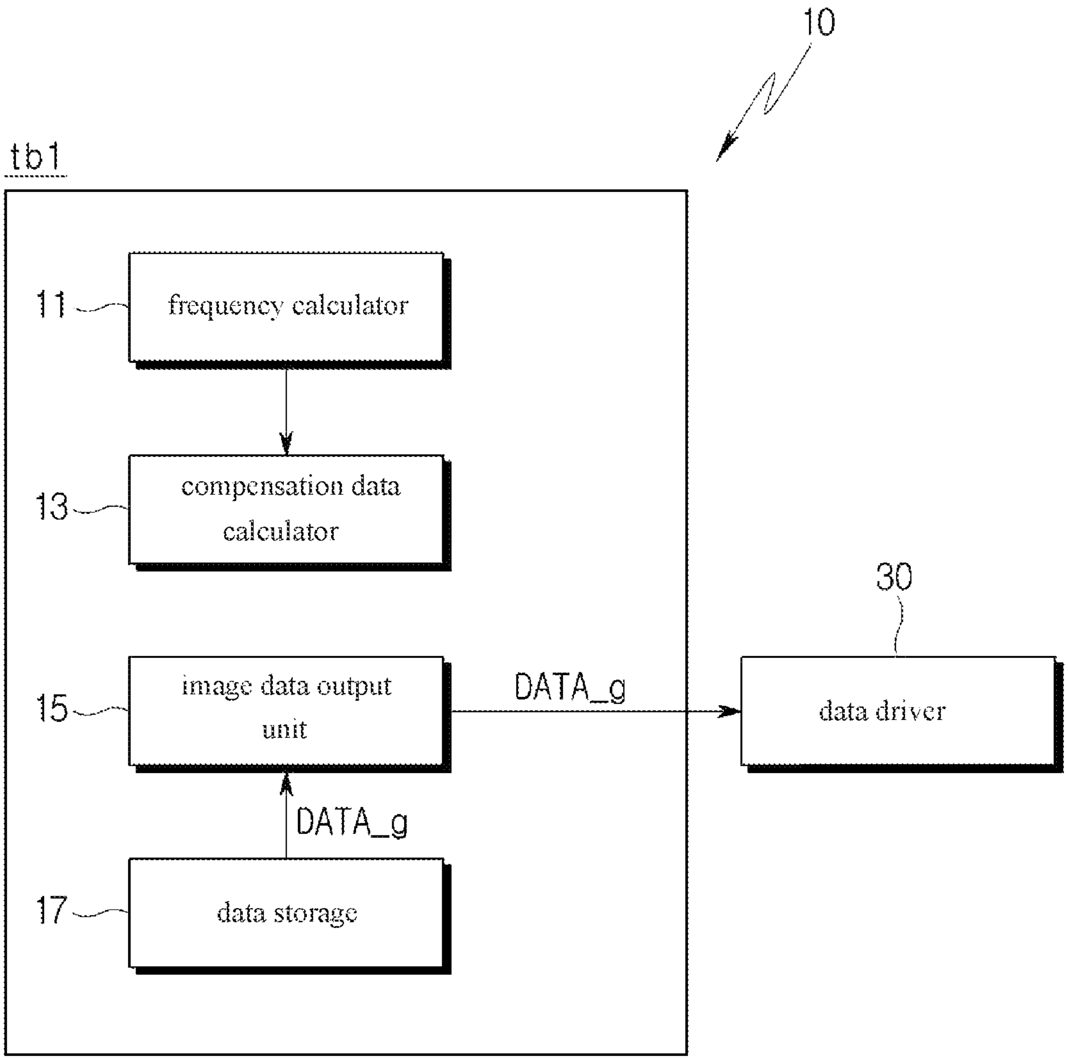
FIG. 9 is a diagram showing elements of a timing controller according to an embodiment of the present disclosure.

FIG. 8 is a waveform diagram of signals input to a display device according to an embodiment of the present disclosure. FIG. 9 is a diagram showing elements of a timing controller according to an embodiment of the present disclosure.

Referring to FIGS. 4, 8 and 9, the frequency calculator 11 can calculate the driving frequency of the previous frame. For example, the frequency calculator 11 can calculate the frequency of a frame previous to the first frame F1, and the frequency of a frame previous to the second frame F2, i.e., the frequency of the first frame F1. The frequency calculator 11 can, for example, calculate the driving frequency of the previous frame based on the duration of the previous frame. In the active periods ta1 and ta2, the frequency calculator 11 can calculate the driving frequency of the previous frame. In the active periods ta1 and ta2, the frequency calculator 11 can compare the driving frequency of the previous frame and the threshold driving frequency TH. When it is identified that the driving frequency of the previous frame is higher than the threshold driving frequency TH, the frequency calculator 11 need not provide a signal for calculating the compensation data to the compensation data calculator 13.

When the signal for calculating the compensation data is not provided to the compensation data calculator 13, the data storage 17 can provide the gray image data DATA_g to the image data output unit 15, and the image data output unit 15 can provide the gray image data DATA_g to the data driver 30 in the first blank period tb1. The data driver 30 can supply the analog data voltage Vdata having a fourth voltage level Vdata_g corresponding to the gray image data DATA_g to the data line DL (see FIG. 1). The gray image data DATA_g can be supplied to the data driver 30 not only in the first blank period tb1 but also in the second data driving preparation period tc2 of the second frame F2, as shown in FIG. 8. Accordingly, provision of the gray image data DATA_g does not stop between the first frame F1 and the second frame F2, even with the synchronization signal vsync. But embodiments of the present disclosure are not limited thereto, whereby provision of the gray image data DATA_g can stop at the end of the first blank period tb1 of the first frame F1, and can be again provided at the beginning of the second data preparation period tc1 of the second frame F2.

In various embodiments of the present disclosure, the first frame F1 and the second frame F2 can have different time lengths, whereby a time length of the first frame F1 can be longer than that of the second frame F2, or a time length of the second frame F2 can be longer than that of the first frame F1. Also, within each of the first frame F1 and F2, the respective data preparation period, the active period and the blank period can vary. For example, in the first frame F1, as provided in FIGS. 4 and 8, among the first data preparation period tc1, the first active period ta1 and the first blank period tb1 in sequence, the first data preparation period tc1 is shown as having the shortest time length, the first blank period tb1 as having the longest time length, and the first active period having a time length between those of the first data preparation period tc1 and the first blank period tb1. But embodiments of the present disclosure are not limited thereto, whereby the relative time lengths of the first data preparation period tc1, the first active period ta1 and the first blank period tb1 can vary. For example, in other embodiments of the present disclosure, the first active period ta1 can have the longest time length among them, so that the first active period ta1 can have a longer time length than that of the first blank period tb1. The same discussion is applicable to the second data preparation period tc2, the second active period ta2 and the second blank period tb2, so a redundant discussion thereof will be omitted.

In various embodiments of the present disclosure, the time lengths of the data preparation period, the active period and the blank period for the frame can depend on the total time length of the frame. For example, when the total time length of the first frame F1 is relatively longer, the individual time lengths of the first data preparation period tc1, the first active period ta1 and the first blank period tb1, respectively can be also relatively long, while when the total time length of the first frame F1 is relatively shorter, the individual time lengths of the first data preparation period tc1, the first active period ta1 and the first blank period tb1, respectively can be also relatively short. In various embodiments of the present disclosure, the individual time of the first data preparation period tc1, the first active period ta1 and the first blank period tb1 can vary in proportion to a change in the total time length of the first frame F1. Based on the above, it can be understood that, when the total time length of the first frame F1 is shorter than the total time length of the second frame F2, the individual time lengths of the first data preparation period tc1, the first active period ta1 and the first blank period tb1 can respectively be shorter than the individual time lengths of the second data preparation period tc2, the second active period ta2 and the second blank period tb2, respectively. Similar discussion is applicable when the total time length of the first frame F1 is longer than that of the second frame F2. However, embodiments of the present disclosure are not limited thereto.

For example, instead of the individual time lengths of the data preparation period, the active period and the blank period varying in relation or proportion to a change in the total time length of the frame, in other embodiments of the present disclosure, one or more of the time lengths of the data preparation period, the active period and the blank period, can be fixed in each frame. For example, the time lengths of the data preparation period and the active period can be fixed, while the blank period can vary based on the total time length of the frame. In various embodiments of the present disclosure, time lengths of the data preparation period and the blank period can be fixed, while the time length of active period can vary relative to or in proportion to the change in the total time length of the frame. But embodiments of the present disclosure are not limited thereto.

As described above, the driving frequency of the previous frame is calculated by the frequency calculator 11, and compared with the threshold driving frequency TH. When it is identified that the driving frequency of the previous frame is lower than the threshold driving frequency TH, the duration of the frame can become longer and the foregoing light emission abnormality can be more likely to be visible.

On the other hand, when it is identified that the driving frequency of the previous frame is higher than the threshold driving frequency TH, the duration of the frame can become shorter and the foregoing light emission abnormality can be less likely to be visible.

For example, a display device can include: a frequency calculator configured to calculate a driving frequency of a previous frame and compare the driving frequency of the previous frame and a threshold driving frequency; a compensation data calculator configured to calculate compensation data based on a comparison result of the frequency calculator that the driving frequency of the previous frame is lower than the threshold driving frequency; a data storage configured to provide compensation data corresponding to the calculated compensation data to an image data output unit; and the image data output unit configured to output the compensation data to a data driver.

For example, the previous frame can be followed by a current frame, the current frame can include an active period and a blank period, the image data output unit can receive image data from the data storage and provides the image data to the data driver in the active period, and the data driver can provide an analog data voltage converted from the image data to a pixel.

For example, the calculation for the driving frequency of the previous frame and the comparison between the driving frequency of the previous frame and the threshold driving frequency by the frequency calculator can be performed in the active period of the current frame.

For example, the calculation of the compensation data by the compensation data calculator can be performed in the active period of the current frame.

For example, the provision of the compensation data corresponding to the calculated compensation data to the image data output unit by the data storage can be performed in the blank period of the current frame.

For example, the current frame is followed by a next frame, the next frame includes a data preparation period subsequent to the blank period of the current frame, and the data preparation period starts in response to a vertical synchronization signal.

For example, in the data preparation period of the next frame, the data storage can provide gray image data to the image data output unit, and the image data output unit can provide the gray image data to the data driver.

For example, based on a comparison result of the frequency calculator that the driving frequency of the previous frame is higher than the threshold driving frequency, in the blank period, the data storage can provide gray image data to the image data output unit, and the image data output unit can provide the gray image data to the data driver.

For example, the calculation of the compensation data by the compensation data calculator can be performed based on image data in the active period of the previous frame.

For example, the compensation data calculator can calculate an average value of image data in the active period of the previous frame, and calculate the compensation data based on the calculated averaged value of the image data of the previous frame.

Although a few embodiments have been described with reference to the accompanying drawings, it will be understood by a person having ordinary knowledge in the art to which the disclosure pertains that the different embodiments can be made without departing from the technical spirit or features. Accordingly, the embodiments described above should be understood to be illustrative and non-limiting in all respects. In addition, the scope of the disclosure is defined by the following appended claims rather than by the foregoing detailed description. Further, the sprit and scope of the appended claims and all modifications or variations from the equivalents thereof should be construed as falling into the scope of disclosure.

What is claimed is:

1. A display device comprising:

a frequency calculator configured to calculate a driving frequency of a previous frame, and compare the driving frequency of the previous frame and a threshold driving frequency;

a compensation data calculator configured to calculate compensation data based on a comparison result of the frequency calculator that the driving frequency of the previous frame is lower than the threshold driving frequency;

a data storage configured to provide the compensation data corresponding to the calculated compensation data to an image data output unit; and the image data output unit configured to output the compensation data to a data driver.

2. The display device of claim 1, wherein the previous frame is followed by a current frame, wherein the current frame comprises an active period and a blank period, wherein the image data output unit receives image data from the data storage and provides the image data to the data driver in the active period, and wherein the data driver provides an analog data voltage converted from the image data to a pixel of the display device.

3. The display device of claim 2, wherein the calculation for the driving frequency of the previous frame and the comparison between the driving frequency of the previous frame and the threshold driving frequency by the frequency calculator are performed in the active period of the current frame.

4. The display device of claim 2, wherein the calculation of the compensation data by the compensation data calculator is performed in the active period of the current frame.

5. The display device of claim 2, wherein the provision of the compensation data corresponding to the calculated compensation data to the image data output unit by the data storage is performed in the blank period of the current frame.

6. The display device of claim 2, wherein the current frame is followed by a next frame, the next frame comprises a data preparation period subsequent to the blank period of the current frame, and the data preparation period starts in response to a vertical synchronization signal.

7. The display device of claim 6, wherein, in the data preparation period of the next frame, the data storage provides gray image data to the image data output unit, and the image data output unit provides the gray image data to the data driver.

8. The display device of claim 2, wherein, based on a comparison result of the frequency calculator that the driving frequency of the previous frame is higher than the threshold driving frequency, in the blank period, the data storage provides gray image data to the image data output unit, and the image data output unit provides the gray image data to the data driver.

9. The display device of claim 2, wherein, the current frame is followed by a next frame, the next frame comprises a data preparation period subsequent to the blank period of the current frame, and the data preparation period starts in response to a vertical synchronization signal, wherein based on a comparison result of the frequency calculator that the driving frequency of the previous frame is higher than the threshold driving frequency, in the blank period, the data storage provides gray image data to the image data output unit, and the image data output unit provides the gray image data to the data driver, and wherein in the data preparation period of the next frame, the data storage continues to provide gray image data to the image data output unit, and the image data output unit continues to provide the gray image data to the data driver.

10. The display device of claim 2, wherein the compensation data calculator provides the compensation data corresponding to the calculated compensation data to the data storage in the blank period of the current frame.

11. The display device of claim 1, wherein the calculation of the compensation data by the compensation data calculator is performed based on image data in the active period of the previous frame.

12. The display device of claim 11, wherein the compensation data calculator calculates an average value of the image data in the active period of the previous frame, and calculates the compensation data based on the calculated averaged value of the image data of the previous frame.

13. A method of performing a variable refresh rate mode of a display device, the method comprising:

Calculating a driving frequency of a previous frame for the display device, and comparing the driving frequency of the previous frame and a threshold driving frequency;

calculating compensation data based on a comparison result of the comparing that the driving frequency of the previous frame is lower than the threshold driving frequency;

providing the compensation data corresponding to the calculated compensation data to an image data output unit of the display device; and outputting the compensation data to a data driver of the display device.

14. The method of claim 13, wherein the previous frame is followed by a current frame, wherein the current frame comprises an active period and a blank period, wherein the calculating of the driving frequency of the previous frame and the driving frequency of the previous frame and the threshold driving frequency is performed in the active period of the current frame, wherein the calculating of the compensation data is performed in the active period of the current frame, and wherein the outputting of the compensation data corresponding to the calculated compensation data is performed in the blank period of the current frame.

15. A timing controller for a display device having a variable refresh rate (VRR) mode, the timing controller comprising:

a frequency calculator configured to calculate a driving frequency of a previous frame, and compare the driving frequency of the previous frame and a threshold driving frequency;

a data storage configured to store image data;

an image data output unit configured to output the image data received from the data storage to a data driver of the display device; and a compensation data calculator configured to calculate compensation data based on a signal from the frequency calculator.

16. The timing controller of claim 15, wherein, when the frequency calculator determines that the driving frequency of the previous frame is less than the threshold driving frequency, the frequency calculator provides the signal to the frequency calculator to calculate the compensation data, and when the frequency calculator determines that the driving frequency of the previous frame is not less than the threshold driving frequency, the frequency calculator does not provide the signal to the frequency calculator to calculate the compensation data.

17. The timing controller of claim 16, wherein, when the frequency calculator does not provide the signal to the frequency calculator to calculate the compensation data, the data storage provides a gray image data to the image data output unit to output the gray image data to the data driver in the blank period.

18. The timing controller of claim 17, wherein the current frame is followed by a next frame, the next frame comprises a data preparation period subsequent to the blank period of the current frame, and wherein the gray image data is continued to be output to the data driver in the data preparation period of the next frame.

19. The timing controller of claim 16, wherein, when the frequency calculator does provide the signal to the frequency calculator to calculate the compensation data, the data storage provides the compensation data to the image data output unit to output the gray image data to the data driver in the blank period.

20. The timing controller of claim 19, wherein the current frame is followed by a next frame, the next frame comprises a data preparation period subsequent to the blank period of the current frame, and wherein a gray image data is output to the data driver in the data preparation period of the next frame.

* * * * *